United States Patent
Maromaty

(10) Patent No.: US 8,281,004 B2
(45) Date of Patent: Oct. 2, 2012

(54) MULTI-THREADED METHOD AND SYSTEM FOR AUTOMATED REMOTE SUBMISSION OF JOBS TO MAINFRAME AND UNIX SYSTEMS FROM THE WINDOWS™ PLATFORM

(75) Inventor: Alexander Maromaty, Addison, IL (US)

(73) Assignee: CA, Inc., Islandia, NY (US)

( * ) Notice: Subject to any disclaimer, the term of this patent is extended or adjusted under 35 U.S.C. 154(b) by 336 days.

(21) Appl. No.: 12/364,803

(22) Filed: Feb. 3, 2009

(65) Prior Publication Data

US 2010/0198961 A1 Aug. 5, 2010

(51) Int. Cl.
*G06F 15/16* (2006.01)

(52) U.S. Cl. ........ 709/224; 709/201; 709/202; 709/203; 709/223; 709/225; 709/226; 719/316; 718/100

(58) Field of Classification Search .......... 709/201–203, 709/223–226; 718/100; 719/315, 316
See application file for complete search history.

(56) References Cited

U.S. PATENT DOCUMENTS

| | | | | |
|---|---|---|---|---|
| 5,978,829 A * | 11/1999 | Chung et al. | ................... | 718/102 |
| 6,202,080 B1 * | 3/2001 | Lu et al. | ......................... | 718/105 |
| 6,289,368 B1 * | 9/2001 | Dentler et al. | ................. | 718/101 |
| 6,505,248 B1 * | 1/2003 | Casper et al. | ................. | 709/224 |
| 7,096,249 B2 * | 8/2006 | Rajic et al. | ..................... | 709/201 |
| 7,185,046 B2 * | 2/2007 | Ferstl et al. | .................... | 709/201 |
| 7,716,061 B2 * | 5/2010 | Keohane et al. | ............... | 705/1.1 |
| 7,747,451 B2 * | 6/2010 | Keohane et al. | ............... | 705/1.1 |
| 2008/0007763 A1 * | 1/2008 | Markel et al. | ................ | 358/1.15 |

* cited by examiner

*Primary Examiner* — Haresh N Patel
*Assistant Examiner* — Mohammad Siddiqi
(74) *Attorney, Agent, or Firm* — Myers Bigel Sibley & Sajovec P.A.

(57) ABSTRACT

A method and system for automated remote submission of jobs to host systems generate a single executable file having a user program specified in a command line. A separate thread is used to submit the single executable file to the host system. The separate thread monitors progress of the single executable file on the host system and posts information associated with the monitored progress of the single executable file.

17 Claims, 4 Drawing Sheets

MULTI-THREADED METHOD AND SYSTEM FOR AUTOMATED REMOTE SUBMISSION OF JOBS TO MAINFRAME AND UNIX SYSTEMS FROM THE WINDOWS™ PLATFORM

FIELD OF THE INVENTION

The present disclosure relates generally to computer application job processing and more particularly to a multi-threaded method and system for automated remote submission of jobs to mainframe and UNIX systems from a local machine, for example, that is running the Windows™ platform.

BACKGROUND OF THE INVENTION

For Windows™ or like platform users, developing mainframe applications usually entails manually uploading a program from the Windows™ or like platform, logging on to the mainframe or host computer systems, and submitting the job, that is, executing the program, and waiting for the output. For example, CA-Easytrieve, which includes fourth generation language (4 GL) query and reporting capabilities and allows users to access many IBM mainframe data formats, requires the user to manually perform those tasks.

BRIEF SUMMARY OF THE INVENTION

A method and system for automated remote submission of jobs to host systems are provided. The method in one aspect may include generating a single executable file having a user program specified in a command line and using a separate thread to submit the single executable file to the host system. The method may also include monitoring progress of the single executable file on the host system and posting information associated with the monitored progress of the single executable file.

A system for automated remote submission of jobs to host systems, in one aspect, may comprise a local user module operable to receive and interpret a command line, and generate a single executable file having a user program specified on the command line. The local user computer-implemented module is further operable to create a separate thread operable to submit the single executable file to a host system. The separate thread is further operable to monitor progress of the single executable file on the host system, and post information associated with the monitored progress of the single executable file.

A system for automated remote submission of jobs to host systems, in another aspect, may comprise means for generating a single executable file having a user program specified on a command line and means for using a separate thread to submit the single executable file to the host system. The system may also include means for monitoring progress of the single executable file on the host system and means for posting information associated with the monitored progress of the single executable file.

Means may include one or more of computer processor, computer processing modules, hardware, firmware, circuitry, software program executable on a machine, and computer readable medium having stored thereon program of instructions executable on machine.

A program storage device readable by a machine, tangibly embodying a program of instructions executable by the machine to perform a method of automated remote submission of jobs to host systems may be also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
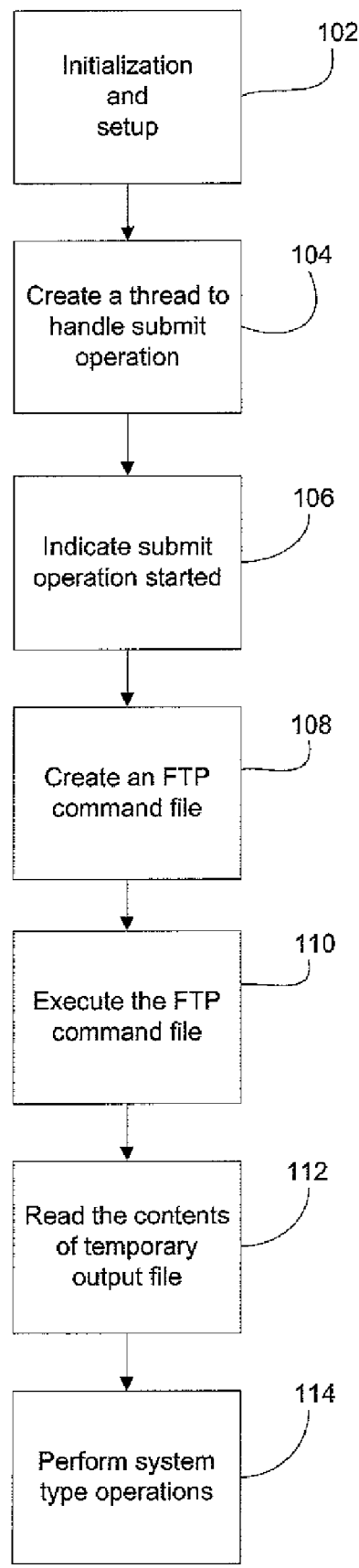
FIG. 1 is a flow diagram illustrating a method in one embodiment of the present disclosure.

A method and system of the present disclosure in one embodiment provides a single executable that is driven by parameters from the command line. The method of the present disclosure may be incorporated into computer applications that perform remote job submission. The parameters may include the name or Internet Protocol ("IP") address of the host computer and the name of the program to be submitted. Optional parameters may include the code page for text translation, name of a prolog and epilog file, the output retrieval type, and whether or not putty link ("plink") secure shell ("ssh") is to be used as a replacement for the standard remote shell ("rsh"). Plink is a command-line connection tool similar to UNIX ssh. PuTTY is a terminal emulator application which can act as a client for the ssh, Telnet, rlogin, and raw TCP computing protocols.

In one embodiment, a temporary file is created that has a prolog file, if specified, a program file and an epilog file. The prolog file has Job Control Language (JCL) or like to be included before the program source. JCL is an IBM™ language and refers to commands or statements to be compiled and/or executed. This set of statements defines the components and requirements of the program to the operating system under which it runs. The epilog file has JCL or like to be included after the program source. The user program is "sandwiched" between the prolog and epilog files.

For UNIX system, the prolog and epilog files may include shell commands and the setting of environment variables that are required for the program to execute. Once the temporary file is created, it may be submitted via File Transfer Protocol ("FTP") or other file transfer mechanism to the remote system. This submission occurs on a separate thread referred to herein as a JOB thread. This JOB thread interfaces with the Window™ system tray and keeps the user informed as to the progress of the job, uploading, submitting, downloading, etc. for example, via popup dialogs or other user interface mechanisms.

For Multiple Virtual Storage (MVS), IBM's operating system for mainframe and large server computers, a computer application job may be submitted to the JES2 subsystem. Briefly, job entry subsystem (JES) receives jobs into the operating system, schedules them for processing by MVS, and controls their output processing. JES2 is a version of this concept. The file is submitted directly to the JES2 input via the "quote site filetype=jes" and an FTP put command. Once the program is submitted, the JOB thread polls the JES2 subsystem to determine if the job has completed. If it has, the result output is downloaded to the specified output file. The user is informed about the job return code. Job return codes may be standard MVS return codes, examples of which may include RC=0; RC=16; ABEND OC1. RC=0 means successful completion, RC=16 notifies that the job failed, ABEND OC1 refers to addressing exception, etc.

For UNIX a shell script is created that is to be run via rsh or ssh if the putty link flag is set on the command line. This shell script invokes the Easytrieve compiler which compiles the program. If any compilation errors are detected, the result output is downloaded to the output file and submission terminates. The program is then executed on the UNIX host. Standard out ("stdout") and standard error ("stderr") redirected to files in memory, disk, and/or like. Like MVS, the JOB thread waits for the completion of execution and downs the output of the execution.

FIG. 1 is a flow diagram illustrating a method in one embodiment of the present disclosure. Initialization and setup phase at 102 may include retrieving command line parameters. Command line parameters may include, for example, command code. That is, commands may be encoded as follows, for example:
  Command code 0=submit
  Command code 1=get (ASCII)
  Command code 2=get (Binary)
  Command code 3=get (ASCII trimmed)
  Command code 4=put (ASCII)
  Command code 5=put (Binary).

Command line parameters may further include hostname, source file name, target file name, initial directory, translation code page, use plink (PuTTy link) flag, for example, 0 for no, 1 for yes, output retrieval flags. Hostname specifies the name or IP address of the host to submit the job, source file name is the user program for submission, target file name refers to file name to use at the host (e.g., for FTP get or put operations), initial directory specifies the directory to use in the host system (e.g., UNIX directory where the submission operations may be performed), translation code page refers to page or table to be used for mapping keyboard codes, output retrieval flags are output code from the job submission. Command line parameters may also include prolog file name and epilog file name. Other parameters may be used.

Output retrieval flags may be encoded as follows:
  Output retrieval flags 0x0000=All.
  Output retrieval flags 0x0001=Hold for select.
  Output retrieval flags 0x0002=Sysprint only.
  Output retrieval flags 0x0003=None.
  Output retrieval flags 0x0010=All if error.
  Output retrieval flags 0x0020=Hold for select if error.
  Output retrieval flags 0x0040=Sysprint only if error.
  Output retrieval flags 0x0080=None if error.
  Output retrieval flags 0x0400=Hold for select if ABEND.

Also, in this stage, for submit or get operations, file check is performed to make sure that the file exists. If the file for submit or get operations does not exist, a return code of "file not found" and/or a message box may be displayed or otherwise presented to alert the user. One or more parameters are also parsed. For instance, program name may be parsed into individual components, for example, directory, name and extension.

Host properties are retrieved from the windows system registry. If the host properties do not exist, a dialog box may be displayed asking the user for the host properties. The host properties may include the user name, password, a check box indicating that the password should be saved in the registry, and radio button progress mode to be used. The progress mode sets the interval at which pop-up progress messages are displayed to and from the system tray job status window. The host properties entered by the user in the registry are saved. Password may be encrypted before saving it, if desired.

Initialization and setup stage may also include creating the system tray icon and job status window. Job status window may be hidden initially and viewed as desired by the user. Attributes such as font, opacity and hang time of the job status window may be also set. Based on the command code on the command line, submit, get or put operation is performed.

Steps 104 to 114 describe the submit operation logic. At 104, a separate thread is created to handle the submit operation. If the thread creation fails, the memory is freed and the operation is terminated. Step 106, displays the job status window and indicates that the submit operation has started. The job status window may be shown only for the specified hang time. Step 108 creates an FTP command file to get the system type via the "quote syst" command. This is used to determine the host system type; i.e., MVS, Virtual Machine ("VM"), Virtual Storage Extended ("VSE") or UNIX. If the file could not be created, error is displayed and the operation is terminated.

Step 110 executes the FTP command file, for example, via the Windows™ ShellExecute function and re-directs the output to a temporary output file. Step 112 reads the contents of the temporary output file to determine the system type. If the user name and/or password are invalid, the user may be prompted to re-enter the user name and password and the logic proceeds to step 108. Depending on the system type, different logic may be performed. At step 114, logic for a determined system type operation is performed. For example, if the system type is MVS, steps shown in FIG. 2 may be performed. As another example, if the system type is UNIX, the logic shown in FIG. 3 may be performed.

Figure 2:
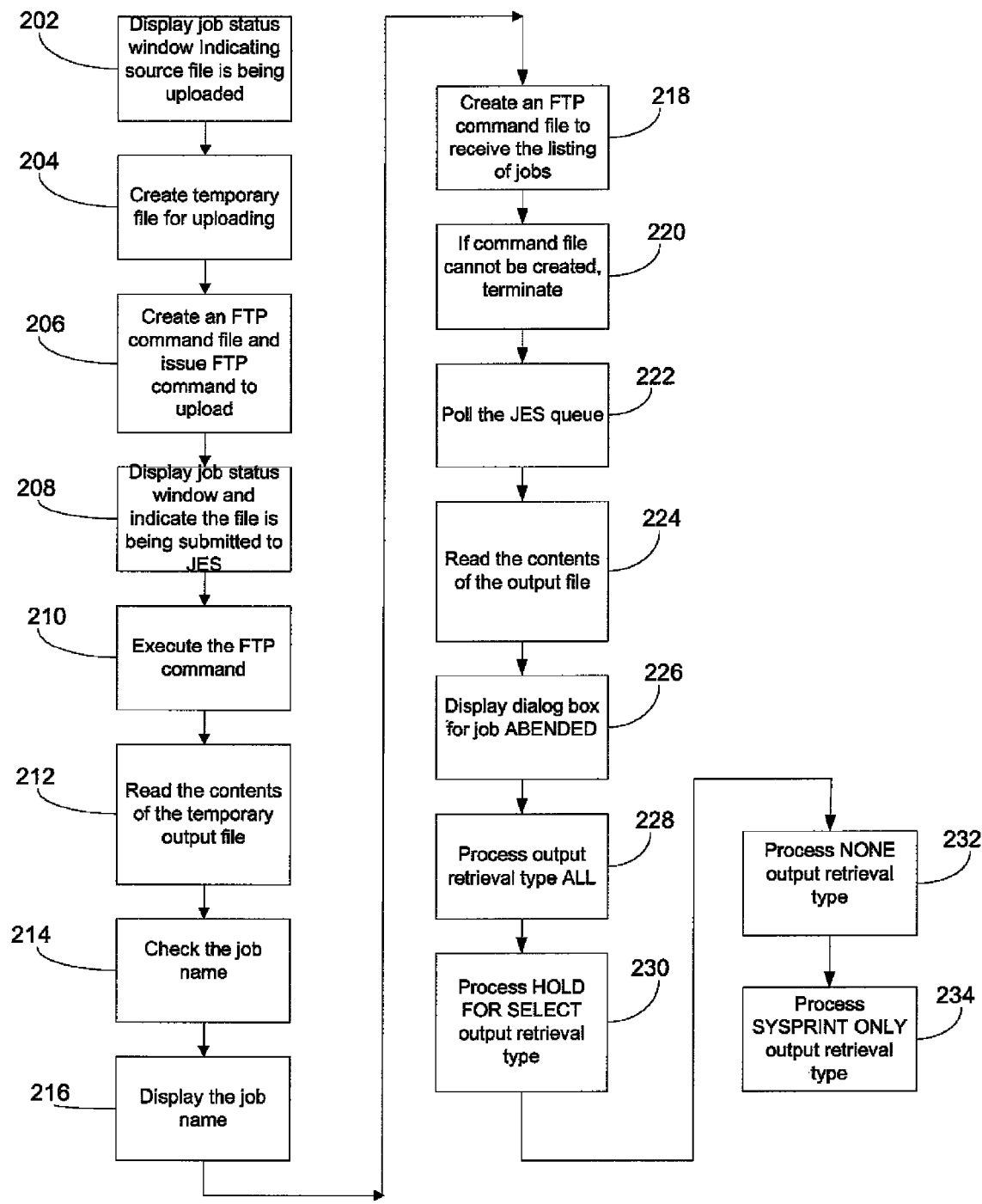
FIG. 2 is a flow diagram illustrating a logic performed for MVS system for automated submission of jobs.

FIG. 2 illustrates a flow diagram illustrating logic in one embodiment of the present disclosure performed for MVS system type at step 114 of FIG. 1. At 202, the job status window is displayed, for example, for the specified hang time, indicating that the source file is being uploaded to the host. At 204 a temporary file is created for uploading. In one embodiment, the contents of the prolog file (if one was specified), the source file and the epilog file (if one was specified) are copied to the temporary file. An error message or code may be displayed if the temporary file could not be created or the specified source, prolog and/or epilog files do not exist.

At step 206, an FTP command file is created that issues a "quote site filetype=jes" command and an FTP put command is issued to upload the temporary file to the JES queue for execution. At 208, the job status window is displayed indicating that the file is being submitted to JES. At 210, the FTP command file is executed via the Windows™ ShellExecute function and the output is redirected to a temporary output file.

Step 212 reads the contents of the temporary output file and looks for the following strings: "PASS COMMAND FAILED". If this string is found, prompt the user to re-enter the user name and password and go to step 102. If string, "IT IS KNOWN TO JES AS" is found, extract the job name and save it for later use.

At step 214, the job name is checked for *UNKNOWN. If the job name is *UNKNOWN, a message box may be displayed indicating that the submit operation failed and indicating that the JOB card is probably invalid. The submit operation is terminated.

At step 216, the job name is displayed in the job status window. At 218, an FTP command file is created that is to be the receiver for the listing of jobs in the JES queue. This is done by using the "quote site filetype=jes", "quote site jes-jobname=*" and a "dir" command followed by the job name.

This command file is used to determine if the job has completed. At step 220, if the FTP command file cannot be created, the submit operation is terminated. At step 222, poll the JES queue by executing this command file via the Windows™ ShellExecute command and redirecting the output to a temporary output file.

At step 224, read the contents of the temporary output file and look for the following strings:

if "JCL ERROR" string is found, set the output retrieval type to the error output retrieval type. Terminate the JES queue polling process.

if "OUTPUT" string is found, the job has completed. Retrieve the "RC=" string and parse the return code value. If the return code value is greater than or equal to 8, set the output retrieval type to the error output retrieval type. In all cases, terminate the JES queue polling process. If the output retrieval type is SYSPRINT and the JES component is of class SYSPRINT, save the associated job component number in an array for later use.

if "ABEND=" string is found, the job has abended. Retrieve the abend code and set the output retrieval type to the abend retrieval type if it has been specified. Terminate the JES queue polling process.

If none of the above strings are found, put the thread to sleep for 500 milliseconds and go to step 218.

At step 226, if the job ABENDED, display a dialog box indicating that the job abended along with the abend code and ask the user if he or she wants to download the output anyway as this usually indicates that a dump was produced. If the user does not want to download the output, terminate the submit process.

At step 228, if the output retrieval type is ALL, create an FTP command file and do the following:

Display the job status window indicating that the job output is being downloaded.
Issue the command "quote site filetype=jes".
Issue the command "quote site jesjobname=*"
If code page translation is required, issue the command "quote site sbdataconn=(IBM-XXXX, IBM-YYYY)" where XXXX is the current Windows™ code page and YYYY is the translation code page that was issued on the startup command line.
Issue a "get" command to retrieve the job output to a temporary file name with the extension of .SPL.
Issue a "del" command to delete the job output from the JES queue.
Execute the FTP command file by using the Windows™ ShellExecute function.
Normalize any mainframe ASA print characters to their corresponding Windows™ counterparts.
Display the job status window indicating that the job has completed.
Bring the downloaded output up in the report viewer for user inspection.
Delete any temporary files created by the submit process.

At step 230, if the output retrieval type is HOLD FOR SELECT, delete any temporary files created by the submit process and display the job status window indicating that the job has completed and the output is being held.

At step 232, if the output retrieval type is NONE, create an FTP command file and do the following:

Issue the command "quote site filetype=jes".
Issue the command "quote site jesjobname=*"
Issue a "del" command to delete the job output from the JES queue.
Execute the FTP command file by using the Windows™ ShellExecute function.
Display the job status window indicating that the job has completed.
Delete any temporary files created by the submit process.

At step 234, if the output retrieval type is SYSPRINT ONLY loop through the array of SYSPRINT job component numbers and display the job status window indicating that the job output for the SYSPRINT job component number is being downloaded. Create an FTP command file as follows:

Issue the command "quote site filetype=jes".
Issue the command "quote site jesjobname=*".
If code page translation is required, issue the command "quote site sbdataconn=(IBM-XXXX, IBM-YYYY)" where XXXX is the current Windows code page and YYYY is the translation code page that was issued on the startup command line.
Issue a "get" command to retrieve the job output component to a temporary file name that includes the job component number with the extension of ".SPL".
Issue a "del" command to delete the job component output from the JES queue.

Also in this step, execute the FTP command file by using the Windows™ ShellExecute function; display the job status window indicating that the job component has been downloaded successfully; bring the downloaded JES component output up in the report viewer for user inspection; and delete any temporary files created by the submit process.

Figure 3:
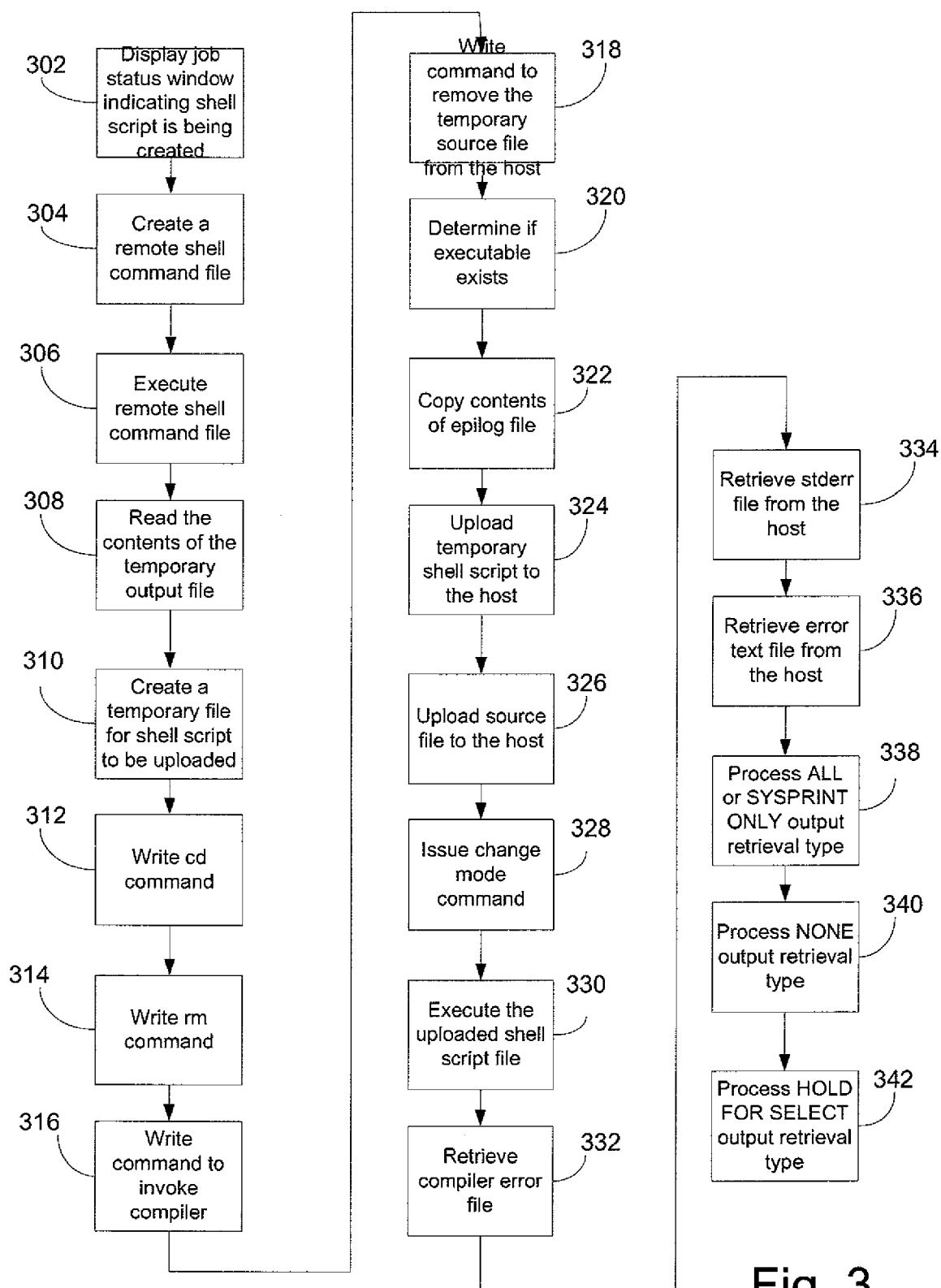
FIG. 3 is a flow diagram illustrating a logic performed for UNIX system for automated submission of jobs.

FIG. 3 is a flow diagram illustrating the logic in one embodiment of the present disclosure performed for the system type UNIX at step 114 of FIG. 1. At 302, display the job status window indicating the shell script is being created. At step 304, create a remote shell command file to verify that rsh or plink is available on this system and re-direct the output to a temporary output file. At step 306, execute the remote shell command file using the Windows™ ShellExecute function.

At step 308, read the contents of the temporary output file and look for the strings "rsh:", "denied", "not recognized" or "fatal error". If any of these strings is found, display a message box indicating that the remote shell process cannot be executed and that the submit operation has been aborted and terminate the submit operation.

At step 310, create a temporary file for the shell script that is to be uploaded to the UNIX host. If a prolog file has been specified, copy the contents of this file to the temporary shell script. At step 312, if an initial directory was specified, write a "cd" command to the temporary shell script file to change to the specified directory. At step 314, write "rm" commands to the temporary shell script file to delete any files that might be left from the previous execution. At step 316, write a command to invoke a compiler such as the Easytrieve compiler (ezt) to the temporary shell script file. Re-direct the output to a file with an extension of ".err".

At step 318, write an "rm" command to remove the temporary source file from the host system. At step 320, determine if the executable file exists after the invocation of the compiler. If the executable exists, perform the following:

If an initial directory was specified, write a command to invoke the executable and re-direct stdout to a file with the extension of ".stdout". Re-direct stderr to a file with the extension of ".stderr".
If an initial directory was not specified, write a command to invoke the executable. Prefix the executable name with ".\". Re-direct stdout to a file with the extension of ".stdout". Re-direct stderr to a file with the extension of ".stderr".

At step 322, if an epilog file has been specified, copy the contents of the epilog file to the temporary shell script file. At step 324, upload the temporary shell script file to the UNIX host. At step 326, upload the source file to the UNIX host. At step 328, issue a "chmod +x" command via rsh or plink to make the uploaded shell script file executable. At step 330, execute the uploaded shell script file via rsh or plink and re-direct stderr to a local temporary output file with the extension of ".submission_error_text". At step 332, retrieve the compiler error file (.err) from the UNIX host using FTP. If compilation errors are found: display the job status window indicating that there are compilation errors; and bring up the compiler error file in the report viewer for inspection by the user.

At step 334, retrieve the stderr file from the UNIX host via FTP and check for execution errors (EZABX error messages). If there are execution errors, set a flag indicating this fact for later use. At step 336, retrieve the "submission error text" file from the UNIX host via FTP and check for submission errors. If the length of the "submission error text" file is greater that zero, perform the following:

Check for the strings "EZABX054", "LICENSE" and "WARNING". If one of these strings is found, set a flag indicating that there is a warning condition.

If any other strings are found, set a flag indicating that there is a submission error. Display the job status window informing the user that there was a submission error.

At step 338, if the output retrieval type is ALL or SYSPRINT ONLY:

Display the job status window indicating that the output is being downloaded.

Retrieve the stdout file from the UNIX host via FTP.

Retrieve the stderr file from the UNIX host via FTP.

Display the job status window indicating that the job has completed.

If the length of the stdout file is greater than zero, bring the stdout file up in the report viewer for inspection by the user.

If the output retrieval type is ALL and the length of the stderr file is greater than zero, bring the stderr file up in the report viewer for inspection by the user.

Delete any output files on the UNIX host via FTP del commands.

At step 340, if the output retrieval type is NONE: Delete the stdout and stderr files on the UNIX host via FTP del commands; and Display the job status window indicating that the job has completed.

At step 342, if the output retrieval type is HOLD FOR SELECT: Display the job status window indicating that the job has completed and the output is being held on the UNIX host.

Figure 4:
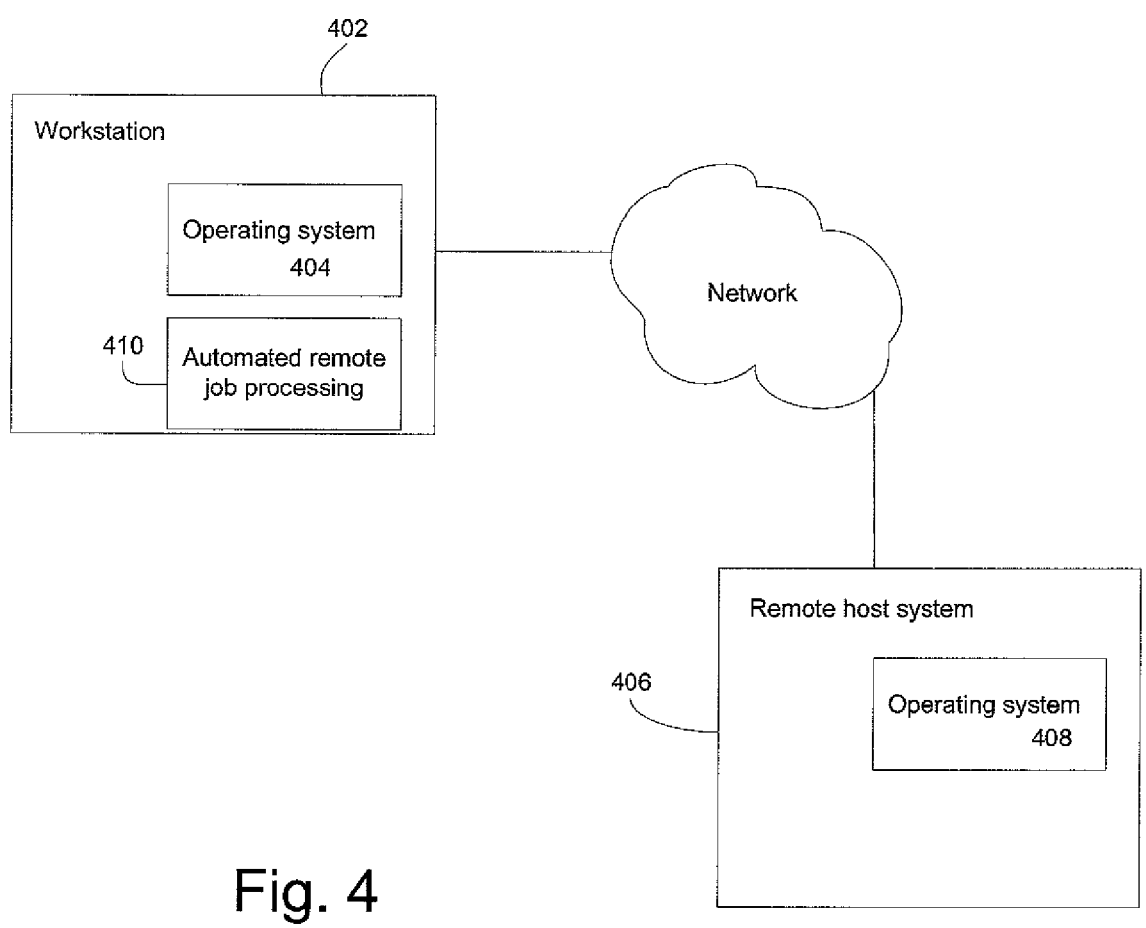
FIG. 4 is a diagram illustrating a system in one embodiment of the present disclosure.

FIG. 4 is a flow diagram illustrating a system of the present disclosure in one embodiment. The system of the present disclosure in one embodiment may include a user platform, for example, a personal computer 402 running on a Window™ platform 404 or like communicating remotely with a host computer 406, for example, a mainframe or like running MVS or UNIX 408 or like operating system. In order to access or manage data or programs in the host system, an automated process 410 according to the method of the present disclosure, for instance, described in detail with reference to FIGS. 1-3, is implemented on the PC 402. This way, an automated process on a local machine can execute commands and programs, and retrieve and/or manage data on a remote machine. Local machine in this disclosure refers to a machine a user is currently logged onto, for example, a PC 402. A remote machine refers to a machine that is connected to the local machine via a network such as LAN, WAN, Internet, wired or wireless, etc. The automated process may be implemented as a computer module or utility that can be incorporated into larger applications such as CA-Easytrieve, or other applications for example that require remote job submission.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A computer-implemented method for automated remote submission of jobs to host systems, comprising:

generating on a user platform different from the host system, a single executable file having a user program specified in a command line in accordance with host properties stored on the user platform;

using a separate thread to submit the single executable file from the user platform to the host system;

outputting results to a temporary output file and scheduling execution of the single executable file based on the results in the temporary output file:

monitoring progress of the single executable file on the host system; and ongoing posting of information associated with the monitored progress of the single executable file based on the separate thread, the information posted on the user platform using at least one of a system tray icon, a popup dialog, and a job status window;

the command line includes a file specifying setting of environment variables on the host system before executing the user program; and the single executable file specifies an output file on the host for the user program to write output; and the separate thread polls the host system for the contents of the output file.

2. The method of claim 1, wherein the single executable file includes host command to execute the user program on the host system, the host command based on the host properties stored in the user platform.

3. The method of claim 1, wherein the single executable file includes contents of a prolog file specifying setting of environment variables on the host system before executing the user program.

4. The method of claim 1, wherein the single executable file includes contents of an epilog file specifying commands to be run after executing the user program on the host system.

5. The method of claim 1, wherein the command line includes host name and a program file of the user program.

6. The method of claim 1, wherein the command line includes an epilog file specifying commands to be run after executing the user program on the host system.

7. The method of claim 6, wherein the epilog file includes commands to clean up the host system after executing the user program.

8. The method of claim 1, wherein the separate thread interfaces with a Windows system tray for posting information associated with the monitored progress of the single executable file.

9. The method of claim 1, wherein FTP command is used to submit the single executable file to the host system.

10. The method of claim 1, wherein the host system is a UNIX system.

11. The method of claim 1, wherein the host system is MVS system.

12. The method of claim 1, wherein the separate thread submits the single executable file to a JES subsystem of the MVS system.

13. A system for automated remote submission of jobs to host systems, comprising:
- a processor;
- means for generating, on a user platform different from the host system, a single executable file having a user program specified on a command line in accordance with host properties stored on the user platform; the command line includes a file specifying setting of environment variables on the host system before executing the user program;
- means for using a separate thread to submit the single executable file from the user platform to the host system;
- means for outputting results to a temporary output file and scheduling execution of the single executable file based on the results in the temporary output file;
- means for monitoring progress of the single executable file on the host system; and means for ongoing posting of information associated with the monitored progress of the single executable file based on the separate thread, the information posted on the user platform using at least one of a system tray icon, a popup dialog, and a job status window,
- the single executable file specifies an output file on the host for the user program to write output; and the separate thread polls the host system for the contents of the output file.

14. A system for automated remote submission of jobs to host systems, comprising:
- a processor; and
- a local user computer-implemented module on a user platform different from the host system to receive and interpret a command line in accordance with host properties stored on the user platform, and generate a single executable file having a user program specified on the command line, the local user computer-implemented module further to create a separate thread to submit the single executable file from the user platform to a host system, and output results to a temporary output file and schedule execution of the single executable file based on the results in the temporary output file,
- the separate thread to monitor progress of the single executable file on the host system, and post information associated with the monitored progress of the single executable file based on the separate thread, the information posted on the user platform using at least one of a system tray icon, a popup dialog, and a job status window;
- the command line includes a file specifying setting of environment variables on the host system before executing the user program; and
- the single executable file specifies an output file on the host for the user program to write output; and the separate thread polls the host system for the contents of the output file.

15. A program storage device readable by a machine, tangibly embodying a program of instructions executable by the machine to perform a method of for automated remote submission of jobs to host systems, comprising:
- generating, on a user platform different from the host system, a single executable file having a user program specified in a command line in accordance with host properties stored on the user platform;
- using a separate thread to submit the single executable file from the user platform to the host system;
- outputting, results to a temporary output file and scheduling execution of the single executable file based on the results in the temporary output file:
- monitoring progress of the single executable file on the host system; and ongoing posting of information associated with the monitored progress of the single executable file based on the separate thread, the information posted on the user platform using at least one of a system tray icon, a popup dialog, and a job stares window;
- the single executable file includes contents of a file specifying setting of environment variables on the host system before executing the user program; and
- the single executable file specifies an output file on the host for the user program to write output; and the separate thread polls the host system for the contents of the output file.

16. The program storage device of claim 15, wherein the single executable file includes host command to execute the user program on the host system, the host command based on the host properties stored in the user platform.

17. The program storage device of claim 15, wherein the single executable file includes contents of an epilog file specifying commands to be run after executing the user program on the host system.

* * * * *